(12) United States Patent
Yamazaki

(10) Patent No.: US 12,480,557 B2
(45) Date of Patent: Nov. 25, 2025

(54) SHOCK ABSORBER

(71) Applicant: DAICEL CORPORATION, Osaka (JP)

(72) Inventor: Masayuki Yamazaki, Tokyo (JP)

(73) Assignee: Daicel Corporation, Osaka (JP)

( * ) Notice: Subject to any disclaimer, the term of this patent is extended or adjusted under 35 U.S.C. 154(b) by 491 days.

(21) Appl. No.: 18/077,327

(22) Filed: Dec. 8, 2022

(65) Prior Publication Data

US 2023/0105662 A1    Apr. 6, 2023

Related U.S. Application Data

(63) Continuation of application No. PCT/JP2021/018366, filed on May 14, 2021.

(30) Foreign Application Priority Data

Jun. 10, 2020 (JP) ................................. 2020-101045

(51) Int. Cl.
  *F16F 3/087* (2006.01)
  *B60R 21/04* (2006.01)
  *B60R 21/045* (2006.01)
  *B60R 21/05* (2006.01)

(52) U.S. Cl.
  CPC ............ *F16F 3/0876* (2013.01); *B60R 21/04* (2013.01); *B60R 2021/0435* (2013.01); *B60R 2021/0442* (2013.01); *B60R 21/045* (2013.01); *B60R 21/05* (2013.01)

(58) Field of Classification Search
  None
  See application file for complete search history.

(56) References Cited

U.S. PATENT DOCUMENTS

| 10,046,723 B1 | 8/2018 | Faruque et al. |
| 2005/0116456 A1* | 6/2005 | Tajima ................. B60R 21/045 280/751 |

(Continued)

FOREIGN PATENT DOCUMENTS

| JP | 2006-151197 A | 6/2006 |
| JP | 2008-221923 A | 9/2008 |

(Continued)

OTHER PUBLICATIONS

KR-20130093346-A: English Machine Translation (Year: 2013).*

(Continued)

*Primary Examiner* — Melanie Torres Williams
(74) *Attorney, Agent, or Firm* — WHDA, LLP

(57) ABSTRACT

The shock absorber includes: a base portion fixed to the attachment target; a shock absorbing portion having flexibility and attached to the base portion so as to be reversibly switchable between a housed state in which the shock absorbing portion is retracted toward the base portion and a protruding state in which the shock absorbing portion protrudes from the base portion; and a drive unit driving the shock absorbing portion to reversibly switch between the housed state and the protruding state. The drive unit, when operating the shock absorbing portion, at least switches the shock absorbing portion from the housed state to the protruding state.

16 Claims, 16 Drawing Sheets

(56) References Cited

U.S. PATENT DOCUMENTS

2010/0108424 A1    5/2010   Suzuki et al.
2019/0299893 A1    10/2019  Kanegae et al.

FOREIGN PATENT DOCUMENTS

JP    2019-172037 A       10/2019
KR    20130093346 A   *   8/2013   ............. B60R 19/02

OTHER PUBLICATIONS

International Search Report (PCT/ISA/210) dated Jul. 6, 2021, issued in counterpart application No. PCT/JP2021/018366, with English translation. (5 pages).
Written Opinion (PCT/ISA/237) dated Jul. 6, 2021, issued in counterpart application No. PCT/JP2021/018366, with English Translation. (6 pages).

\* cited by examiner

SHOCK ABSORBER

TECHNICAL FIELD

The present disclosure relates to a shock absorber used for a vehicle.

BACKGROUND ART

In the related art, a technology for absorbing a shock caused by an accident or the like is known. For example, Patent Document 1 discloses an energy absorber for protecting a pedestrian or the like colliding with a bumper of a vehicle by absorbing a shock generated on the bumper of the vehicle. In this energy absorber, respective gaps between a plurality of fins connected to a base and absorbing a shock, are formed.

CITATION LIST

Patent Document

Patent Document 1: U.S. Pat. No. 10,046,723

SUMMARY OF INVENTION

Technical Problem

The shock absorber needs to form a region where a shock absorbing member can flex. For example, in the energy absorber described in Patent Document 1, respective gaps between a plurality of fins correspond to the region. Since the shock absorber has a bulky structure as a whole when the region is formed, the position of the shock absorber to be mounted on the vehicle is limited, and the degree of freedom of the arrangement position is reduced.

In view of the above problem, it is an object of the present disclosure to provide a shock absorber capable of improving the degree of freedom of an arrangement position.

Solution to Problem

In order to solve the above problem, the present disclosure is provided with a shock absorbing portion capable of reversibly switching between a housed state and a protruding state.

Specifically, disclosed is a shock absorber that is attached to an attachment target constituting a vehicle and reduces a shock during operation. The shock absorber includes a base portion fixed to the attachment target, a shock absorbing portion having flexibility and attached to the base portion, so as to be reversibly switchable between a housed state in which the shock absorbing portion is retracted toward the base portion and a protruding state in which the shock absorbing portion protrudes from the base portion, and a drive unit configured to drive the shock absorbing portion and reversibly switch between the housed state and the protruding state. When operating the shock absorbing portion, the drive unit at least switches the shock absorbing portion from the housed state to the protruding state.

Since the shock absorbing portion of the shock absorber can be switched between the housed state and the protruding state, the shock absorbing portion can be prevented from being bulky by maintaining the housed state when the shock absorber is not in operation, thereby improving the degree of freedom of arrangement. The shock absorber can return to its original shape even after operation because the shock absorbing portion has flexibility, and can be repeatedly used because it is switchable between the protruding state and the housed state.

In the shock absorber described above, the shock absorbing portion may include a plurality of shock absorbing members provided in a plurality of columns, the plurality of shock absorbing members each being rotatably attached to a first pivoting axis of a plurality of first pivoting axes that extend in a first direction relative to an installation surface of the base portion and are spaced apart from each other in a direction orthogonal to the first direction, each of the plurality of shock absorbing members provided in the plurality of columns may be: maintained in a falling down orientation along the installation surface in the housed state; rotated and driven in a predetermined activating direction about the first pivoting axis and switched from the falling down orientation to a standing orientation in which each of the plurality of shock absorbing members is erected from the installation surface, when being switched from the housed state to the protruding state; and rotated and driven in the falling down direction opposite to the activating direction about the first pivoting axis and switched from the standing orientation to the falling down orientation, when being switched from the protruding state to the housed state. According to the shock absorber having such a configuration, it is possible to prevent the shock absorbing member from being bulky in the housed state, by setting the shock absorbing member to a falling down orientation in the housed state and setting the shock absorbing member to a standing orientation in the protruding state.

The shock absorber may include a regulating portion configured to regulate the rotation about the first pivoting axis in the activating direction when each of the plurality of shock absorbing members is switched from the falling down orientation to the standing orientation. Thus, the shock absorber can reliably switch the shock absorbing member to the standing orientation.

In the shock absorber described above, the shock absorbing portion may further include a plurality of auxiliary members having flexibility and configured to erect the plurality of shock absorbing members, the plurality of auxiliary members being rotatably attached on an installation surface about a second pivoting axis intersecting the first pivoting axis, each of the plurality of auxiliary members may be maintained in a falling down orientation along the installation surface in the housed state in a manner that a part of a shock absorbing member to be erected of the plurality of shock absorbing members covers, from above, at least a part of an auxiliary member of the plurality of auxiliary members, each of the plurality of auxiliary members may be rotated and driven in a predetermined activating direction about the second pivoting axis and switched from the falling down orientation to a standing orientation, when being switched from the housed state to the protruding state, each of the plurality of auxiliary members may be rotated and driven in the falling down direction opposite to the activating direction about the second pivoting axis and switched from the standing orientation to the falling down orientation, when being switched from the protruding state to the housed state, and each of the plurality of auxiliary members may rotate the shock absorbing member to be erected in an activating direction of the first pivoting axis by pushing up the shock absorbing members, when being switched from the falling down orientation to the standing orientation. According to the shock absorbing portion having such a configuration, it is possible to prevent the auxiliary member from being bulky in the housed state, by setting the auxiliary member in the falling down orientation in the housed state and setting the auxiliary member in the standing orientation in the protruding state.

In the shock absorber described above, each of the plurality of auxiliary members may include a first abutment portion that abuts against the shock absorbing member to be erected when being switched to the standing orientation, and the first abutment portion may regulate rotation of the shock absorbing member to be erected in the falling down direction According to the shock absorber having such a configuration, when a force is applied to the shock absorbing member in the standing orientation, the shock absorbing member can be maintained in the standing orientation.

In the shock absorber described above, each of the plurality of auxiliary members may include a second abutment portion that abuts against a shock absorbing member in another column adjacent to the shock absorbing member to be erected, when being switched to the standing orientation. According to the shock absorber having such a configuration, the shock absorbing member can be maintained in the standing orientation even when a force is applied to the shock absorbing member in the standing orientation.

In the shock absorber described above, an angle formed between the first pivoting axis and the second pivoting axis may be an acute angle, and each of the plurality of shock absorbing members may include a groove portion that prevents each of the plurality of auxiliary members from interfering with the second abutment portion of the auxiliary member, in a process of switching the plurality of auxiliary members from the falling down orientation to the standing orientation. According to the shock absorber having such a configuration, the auxiliary member can reliably switch the shock absorbing member from a falling down orientation to a standing orientation.

In the shock absorber described above, at least a part of the plurality of auxiliary members may be an intermediate auxiliary member disposed between the shock absorbing member to be erected and the shock absorbing member on another column adjacent to the shock absorbing member to be erected, and when the intermediate auxiliary member is in the standing orientation, the shock absorbing member to be erected and the first abutment portion of the intermediate auxiliary member may abut against each other, and the shock absorbing members on the other column and the second abutment portion of the intermediate auxiliary member may abut against each other. According to the shock absorber having such a configuration, the shock absorbing member can be maintained in the standing orientation even when a force is applied to the shock absorbing member in the standing orientation.

In the shock absorber described above, the shock absorbing portion may further include one or more driving force transmitting members coupled to each of the plurality of auxiliary members, at least partially having flexibility, and driven by the drive unit, and by driving the one or more driving force transmitting members when the drive unit actuates the shock absorbing portion, the auxiliary member may be switched from the falling down orientation to the standing orientation, and the shock absorbing member may be switched from the falling down orientation to the standing orientation, accompanying the auxiliary members. In this manner, a plurality of driving force transmitting member or only one driving force transmitting member may be provided.

In the shock absorber described above, the shock absorbing portion may include a single driving force transmitting member, and the plurality of auxiliary members may be coupled to the single driving force transmitting member. Thus, only one driving force transmitting member may be provided.

In the shock absorber described above, the driving force transmitting member may include a plate-shaped portion and may be driven by the drive unit while maintaining a state in which the plate-shaped portion is parallel to the installation surface. According to the shock absorber having such a configuration, the plate-shaped portion of the driving force transmitting member can receive a part of the body of an occupant, and the occupant can be adequately protected.

The shock absorber described above may further include a plurality of the shock absorbing portions, wherein a plurality of holes may be formed on the installation surface of the base portion, each of the plurality of shock absorbing portions may be arranged in a hole of the plurality of holes, in the housed state, the shock absorbing portion may be stored in the hole, in the protruding state, the shock absorbing portion may protrude from hole, and the drive unit may switch to the protruding state in which the shock absorbing portion protrudes from the hole, by supplying fluid into the shock absorbing portion and expanding the shock absorbing portion. The fluid may be compressed air or a predetermined liquid such as water.

In the shock absorber described above, the installation surface may be an interior lining that forms an interior of a cabin, and each of the plurality of shock absorbing portions may be arranged and protrude from the hole toward an occupant boarding the vehicle. Since the shock absorber having such a configuration can be arranged in the cabin, the degree of freedom of arrangement can be improved.

Advantageous Effects of Invention

According to the technique of the present disclosure, the degree of freedom of the arrangement position of the shock absorber can be improved.

DESCRIPTION OF EMBODIMENTS

Hereinafter, a shock absorber according to an embodiment of the present disclosure will now be described with reference to the drawings. It should be noted that the respective configurations and the combinations thereof in the respective embodiments are only examples, and the configurations may be added, omitted, substituted, or otherwise modified as appropriate within a scope that does not depart from the spirit of the present disclosure. The present disclosure is not limited by embodiments, but only by the scope of the claims.

First Embodiment

A shock absorber according to a first embodiment will be described. The shock absorber according to the present embodiment is mounted on a vehicle such as an automobile, and is exemplified as a device for protecting an occupant in the vehicle. The shock absorber is attached to an attachment target which constitutes the vehicle and protects the occupant during operation. Examples of the attachment target which constitutes the vehicle include a structure which constitutes the vehicle body such as a pillar or a ceiling, and a structure which constitutes the vehicle body such as a dashboard or a steering wheel. The shock absorber is fixed to the vehicle by being attached to such an attachment target.

Figure 1A:
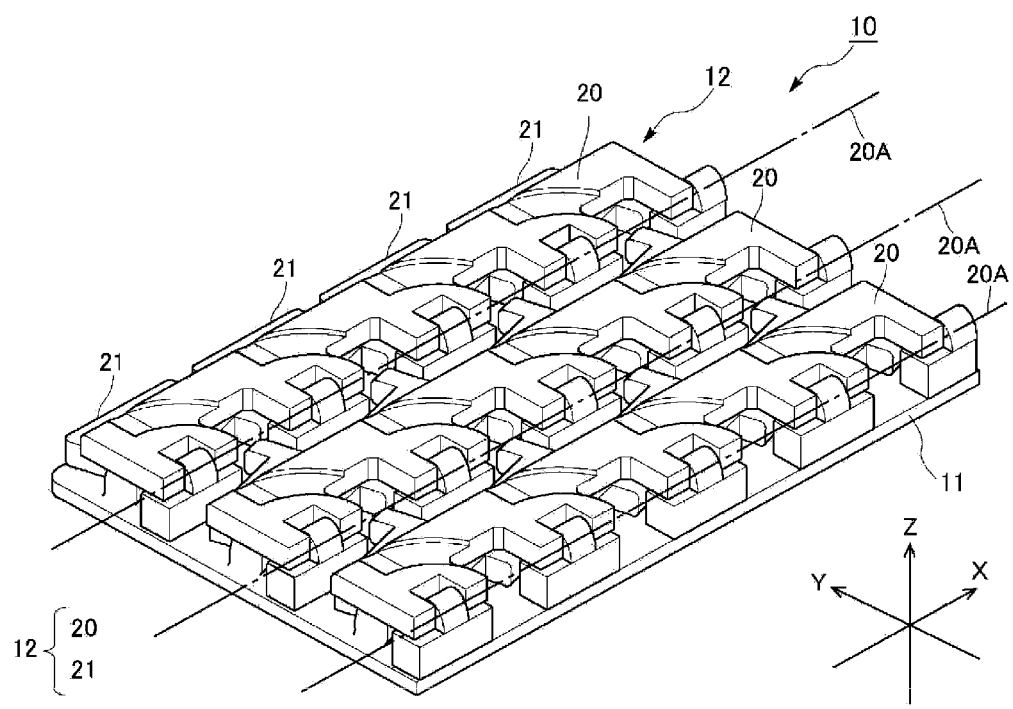
FIG. 1A is an external perspective view (part 1) schematically illustrating a shock absorber according to a first embodiment.
Figure 1B:
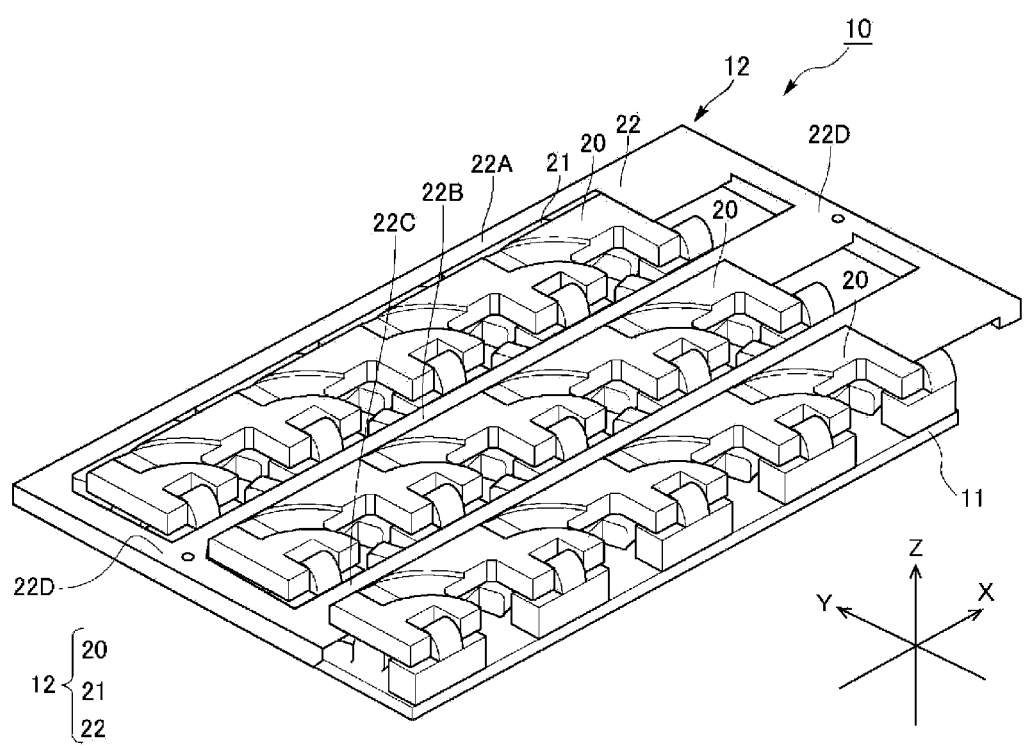
FIG. 1B is an external perspective view (part 2) schematically illustrating the shock absorber according to the first embodiment.
Figure 2A:
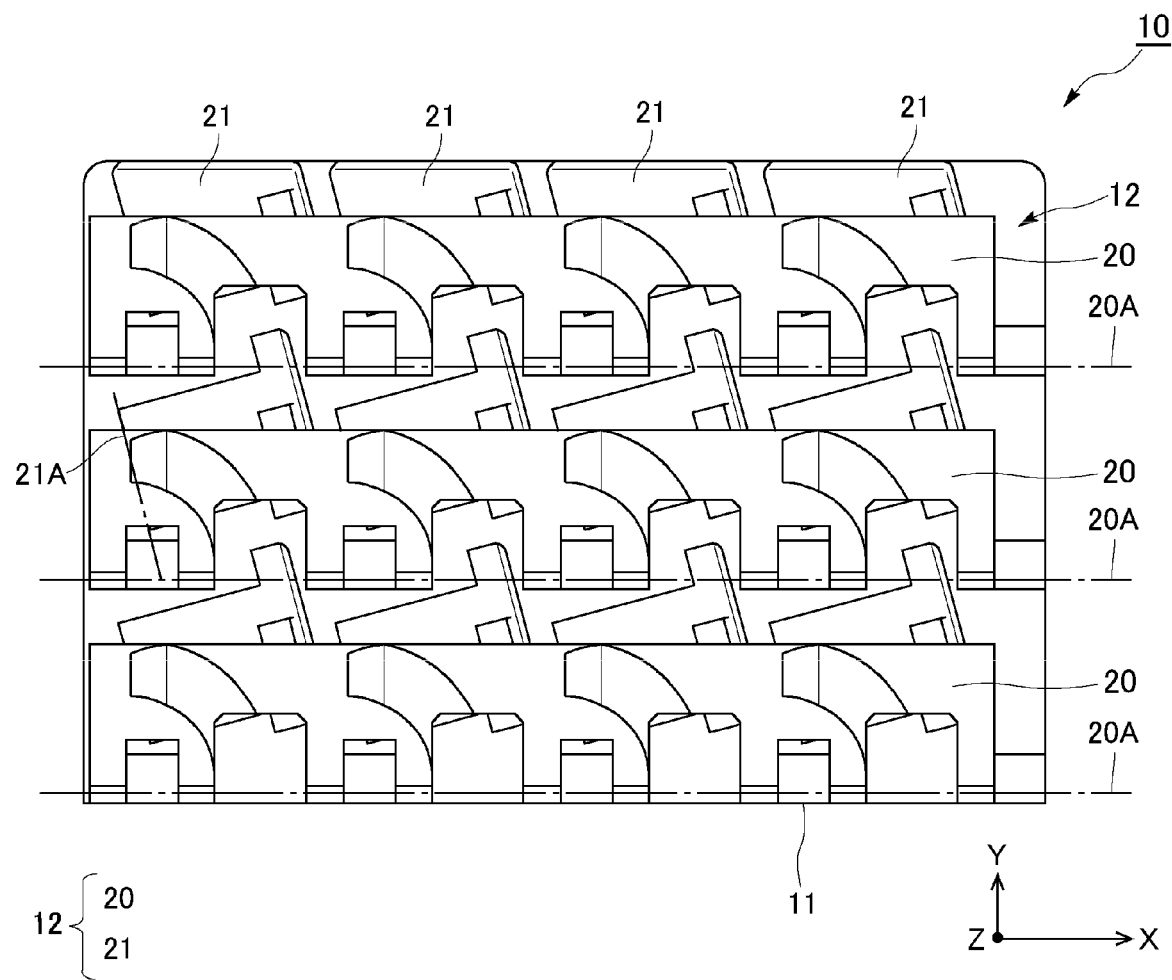
FIG. 2A is a plan view (part 1) schematically illustrating the shock absorber according to the first embodiment.
Figure 2B:
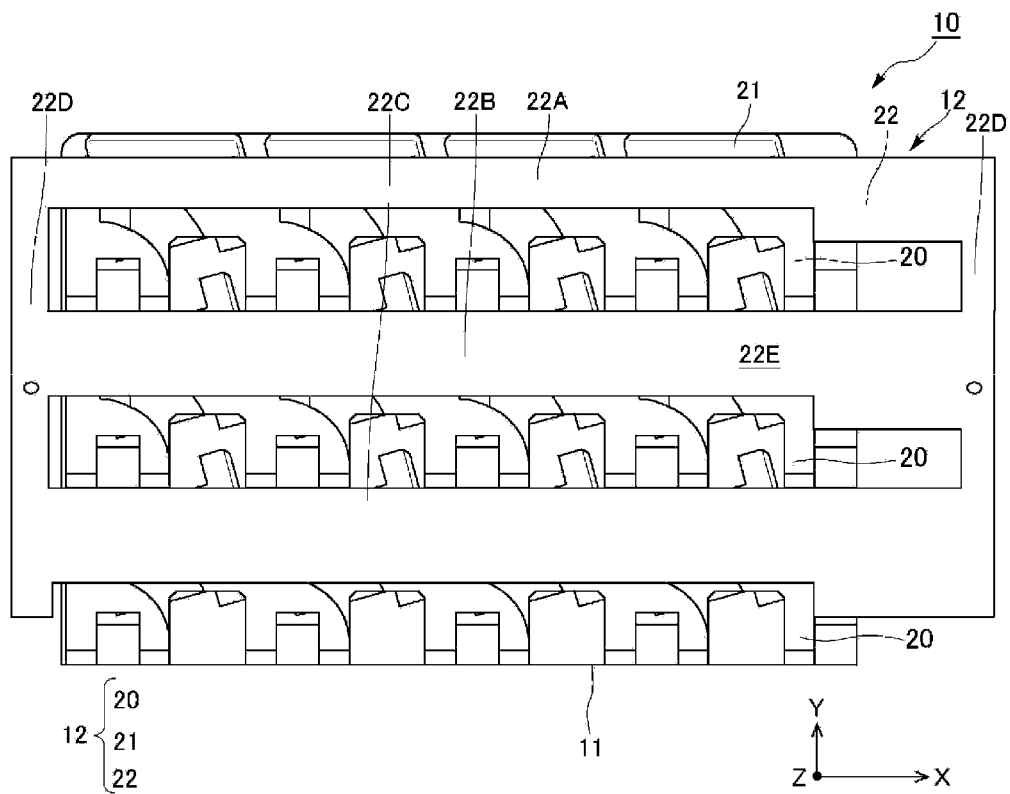
FIG. 2B is a plan view (part 2) schematically illustrating the shock absorber according to the first embodiment.

Next, the shock absorber 10 according to the present embodiment will be described in detail with reference to FIGS. 1A to 2B. FIGS. 1A and 1B are perspective views schematically illustrating an appearance of the shock absorber 10 according to the present embodiment. FIGS. 2A and 2B are plan views schematically illustrating an appearance of the shock absorber 10 according to the present embodiment. The shock absorber 10 includes a base portion 11 attached to an attachment target of a vehicle, and a shock absorbing portion 12 attached to a front surface (an example of an "installation surface") side of the base portion 11. The base portion 11 has a rectangular plate-like shape, and the shock absorbing portion 12 is arranged on the front surface side of the base portion 11, and a back surface side is attached to an attachment target. Hereinafter, as illustrated in FIGS. 1A to 2B, the direction along the long side of the base portion 11 is defined as an X-axis, the direction along the short side of the base portion 11 is defined as a Y-axis, and the direction orthogonal to both the X-axis and the Y-axis (the direction orthogonal to the front surface and the back surface of the base portion) is defined as a Z-axis. The shock absorber 10 is a device for protecting an occupant to be protected positioned in the Z-axis direction. Note that the direction along the X-axis is defined as a "column" of the matrix, and the direction along the Y-axis is defined as a "line" of the matrix.

The shock absorbing portion 12 has flexibility as a whole, and absorbs a force (load) applied to an occupant by deforming when an accident or the like occurs in a vehicle and an inertial force is generated on the occupant and the occupant collides with the shock absorbing portion 12. Thus, the shock absorbing portion 12 protects the occupant. The shock absorbing portion 12 is configured to protrude toward a cabin in which the occupant boards. More specifically, the shock absorbing portion 12 is configured to be reversibly switchable between a housed state where the shock absorbing portion 12 is retracted from the cabin toward the base portion 11 and a protruding state where the shock absorbing portion 12 protrudes from the base portion 11 toward the cabin. In the state illustrated in FIGS. 1A to 2B, the shock absorbing portion 12 is in the housed state.

The shock absorbing portion 12 includes a shock absorbing member 20, a fin 21 (an example of an "auxiliary member"), and a top plate portion 22 (an example of a "driving force transmitting member"). In FIGS. 1A and 2A, the top plate portion 22 is not illustrated for description.

The shock absorbing member 20 is formed of rubber or the like and has flexibility. The shock absorbing members 20 have a shape in which the direction along the X-axis direction is the longitudinal direction (a shape extending integrally in the X-axis direction), and three shock absorbing members 20 are arranged in three columns in the Y-axis direction. The shock absorbing member 20 is attached to the front surface side of the base portion 11 so as to be rotatable with respect to a pivoting axis 20A (an example of a "first pivoting axis") extending in a direction (an example of a "first direction") along the X-axis with respect to the front surface of the base portion 11. In FIGS. 1A and 2A, the pivoting axis 20A is represented by a dashed line. Respective pivoting axes 20A of the three shock absorbing members 20 are spaced apart from each other in a direction along the Y-axis (an example of a "second direction") such that each shock absorbing member 20 can operate without interfering with each other. Hereinafter, three shock absorbing members provided in three columns may be referred to as a plurality of columns of shock absorbing members 20. Thus, the shock absorbing portion 12 includes the plurality of columns of shock absorbing members 20.

Each of the plurality of columns of shock absorbing members 20 is maintained in a falling down orientation along the front surface of the base portion 11 in a housed state, as illustrated in FIG. 1A. Each of the plurality of columns of shock absorbing members 20 is rotated and driven in the activating direction about the pivoting axis 20A when being switched from the housed state to the protruding state, so as to be switched from the falling down orientation to the standing orientation in which each of the plurality of columns of shock absorbing members 20 is erected from the front surface of the base portion 11. The activating direction of the shock absorbing member 20 is clockwise when viewed toward the positive direction of the X-axis. When being switched from the protruding state to the housed state, each of the plurality of columns of shock absorbing members 20 is rotated and driven in a falling down direction opposite to the activating direction about the pivoting axis 20A to switch from the standing orientation to the falling down orientation. The falling down direction of the shock absorbing member 20 is counterclockwise when viewed toward the positive direction of the X-axis. As described above, each of the plurality of columns of shock absorbing members 20 is configured to be reversibly switchable between the housed state and the protruding state.

The fin 21 is formed of rubber or the like and has flexibility. The fin 21 erects the shock absorbing member 20 by transmitting power from the drive unit to the shock absorbing member 20. In the present embodiment, four fins 21 are arranged for one shock absorbing member 20. That is, a total of twelve fins 21 are arranged in four lines in the direction along the X-axis and in three columns in the direction along the Y-axis. A plurality of fins 21 are attached to the front surface of the base portion 11 about a pivoting axis 21A (an example of a "second pivoting axis") that intersects the pivoting axis 20A. In FIG. 2A, the pivoting axis 21A of the fin 21 in the first line and the second column is indicated by a dashed line. The pivoting axes 21A of the fins 21 are parallel to each other. The plurality of fins 21 are rotatable about the respective pivoting axes 21A.

In the housed state, each of the plurality of fins 21 is maintained in a falling down orientation along the surface of the base portion 11 such that a part of the shock absorbing member 20 to be erected covers at least a part of the fin 21 from above. Each of the plurality of fins 21 erects the shock absorbing member 20 arranged in the same column. Each of the plurality of fins, when being switched from the housed state to the protruding state, is rotated and driven in an activating direction about the pivoting axis 21A to switch from the falling down orientation to the standing orientation. The activating direction of the fin 21 is counterclockwise when viewed toward the positive direction of the Y-axis. Each of the plurality of fins 21, when being switched from the protruding state to the housed state, is rotated and driven in a falling down direction opposite to the activating direction about the pivoting axis 21A to switch from the standing orientation to the falling down orientation. The falling down direction of the fin 21 is clockwise when viewed toward the positive direction of the Y-axis. When the fin 21 is switched from the falling down orientation to the standing orientation, the shock absorbing member 20 to be erected is pushed up, so that the shock absorbing member 20 can be rotated in the activating direction of the pivoting axis 20A. The angle formed by the pivoting axis 20A of the shock absorbing member 20 and the pivoting axis 21A of the fin 21 is preferably an acute angle, not a right angle.

The top plate portion 22 illustrated in FIGS. 1B and 2B is made of rubber or the like and has flexibility. The top plate portion 22 is provided to transmit power from the drive unit to each fin 21 by being driven by the drive unit. The top plate portion 22 includes coupling portions 22A to 22C each coupled to the fins 21 in the same column, that is the fins 21 for erecting the same shock absorbing member 20. Each of the coupling portions 22A to 22C has a shape having a longitudinal direction along the X-axis. The coupling portion 22A is coupled to the fins 21 in the first column. The coupling portion 22B is coupled to the fins 21 in the second column. The coupling portion 22C is coupled to the fins 21 in the third column. Thus, the top plate portion 22 is coupled to all fins 21.

The top plate portion 22 includes a pair of connecting portions 22D which connect and integrate the respective coupling portions 22A to 22C. The connecting portions 22D connect the respective coupling portions 22A to 22C at both ends in the direction along the X-axis. Thus, the top plate portion 22 can transmit the power of the drive unit to all the fins 21. In this way, in the present embodiment, the shock absorbing portion 12 includes a single top plate portion 22 in which the coupling portions 22A, 22B, 22C and the connecting portions 22D are integrally formed.

When the drive unit of the shock absorber 10 actuates the shock absorbing portion 12, the top plate portion 22 is driven to switch the fins 21 from a falling down orientation to a standing orientation, and each shock absorbing member 20 is switched from a falling down orientation to a standing orientation accompanying the fins 21. Thus, the shock absorber 10 according to the present embodiment can switch the shock absorbing portion 12 from the housed state to the protruding state when the shock absorbing portion 12 is activated by the drive unit.

Figure 3A:
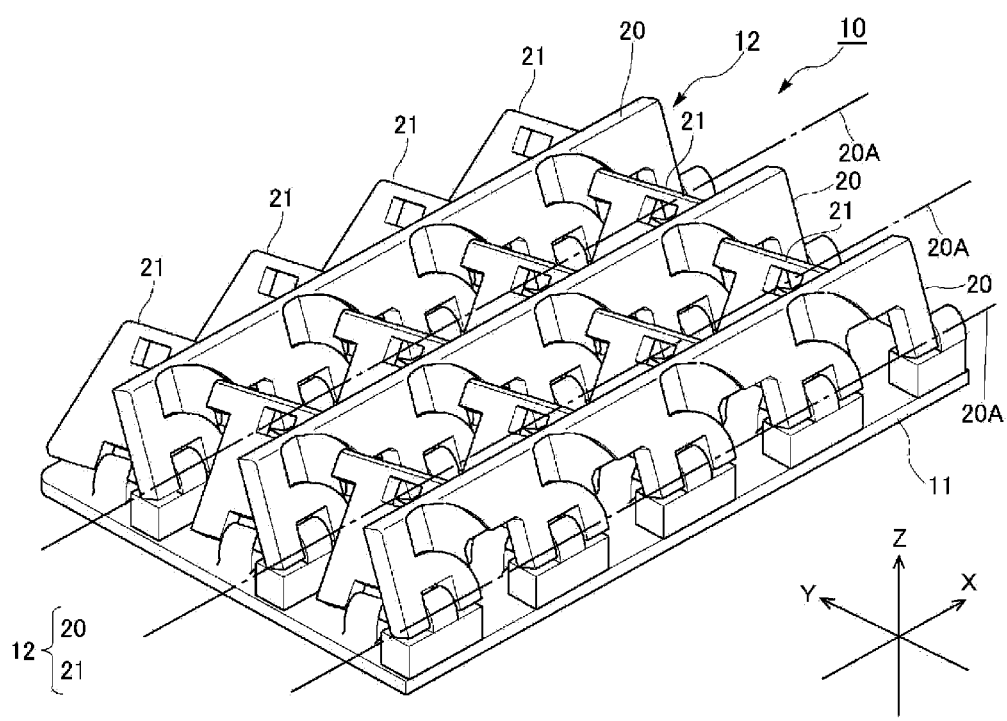
FIG. 3A is an external perspective view (part 3) schematically illustrating the shock absorber according to the first embodiment.
Figure 3B:
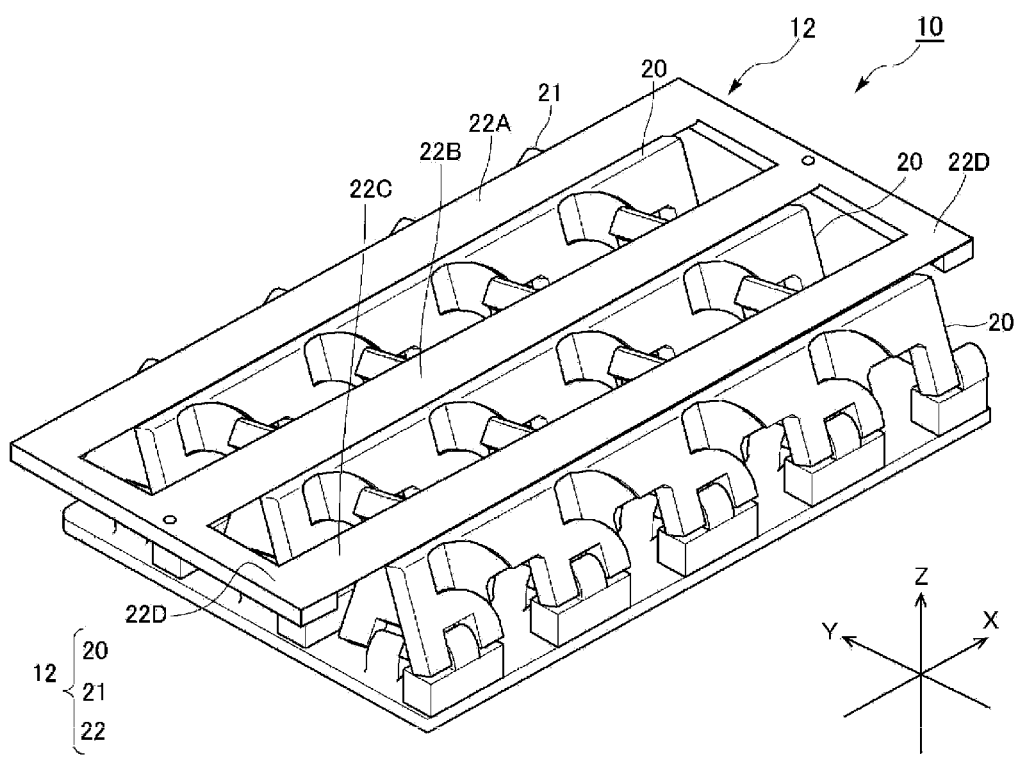
FIG. 3B is an external perspective view (part 4) schematically illustrating the shock absorber according to the first embodiment.
Figure 4A:
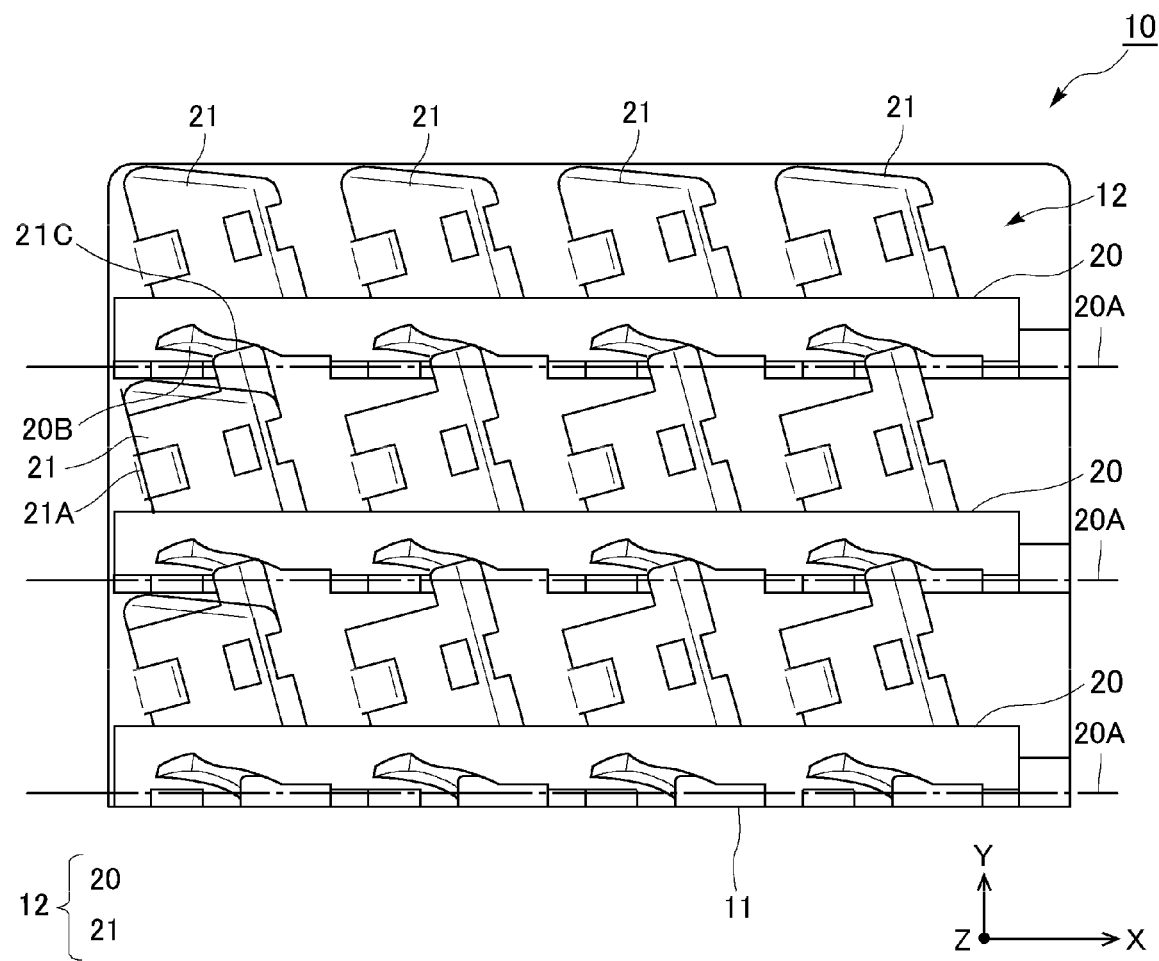
FIG. 4A is a plan view (part 3) schematically illustrating the shock absorber according to the first embodiment.
Figure 4B:
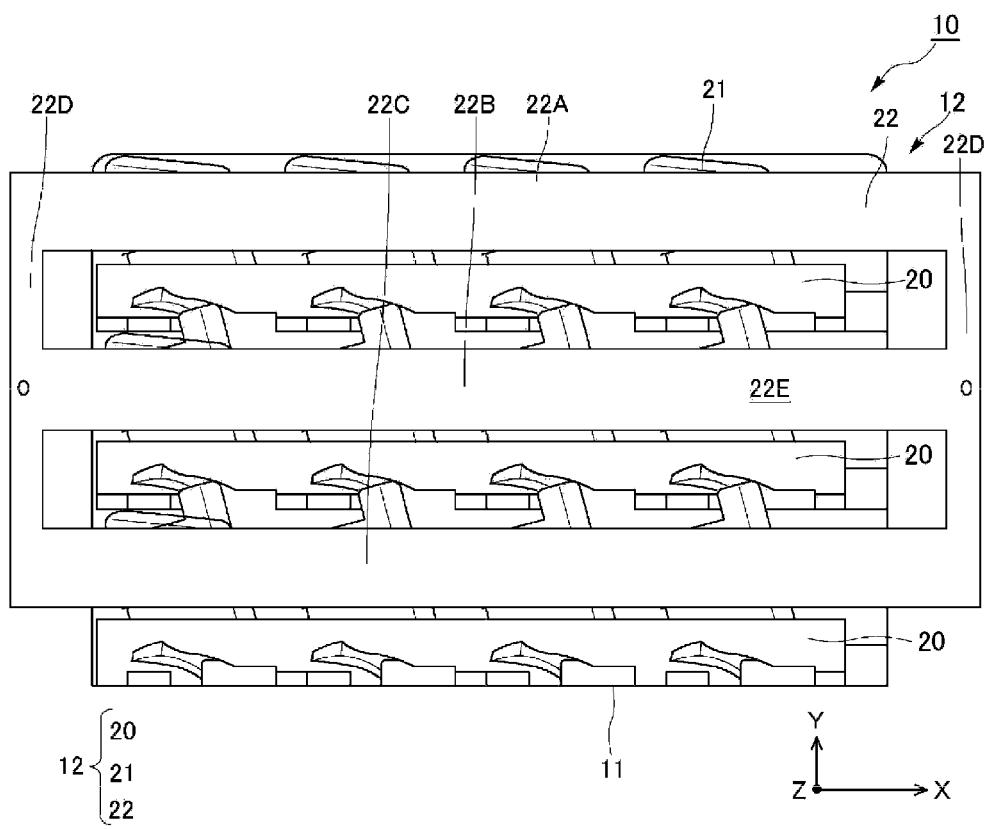
FIG. 4B is a plan view (part 4) schematically illustrating the shock absorber according to the first embodiment.
Figure 5A:
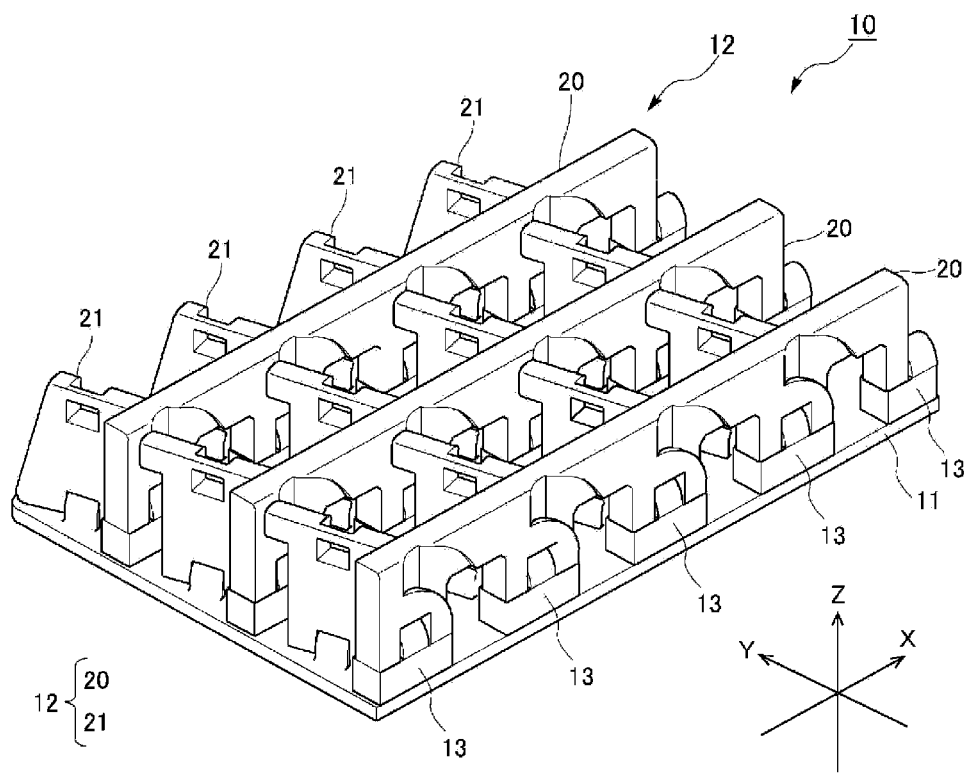
FIG. 5A is an external perspective view (part 5) schematically illustrating the shock absorber according to the first embodiment.
Figure 5B:
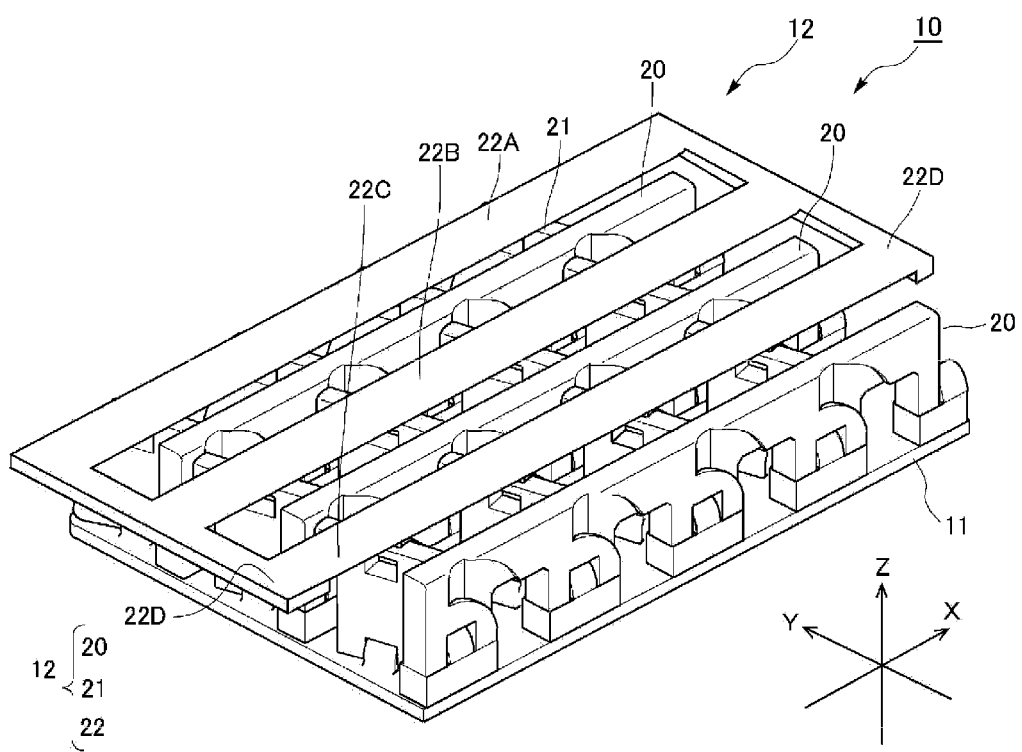
FIG. 5B is an external perspective view (part 6) schematically illustrating the shock absorber according to the first embodiment.
Figure 6A:
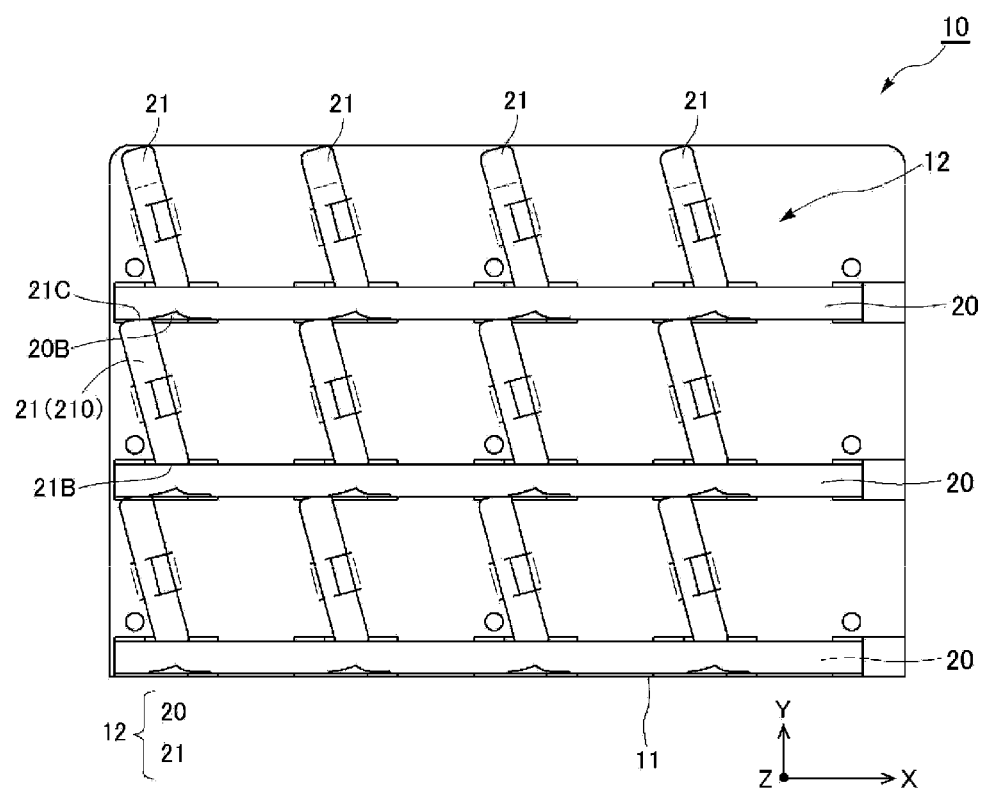
FIG. 6A is a plan view (part 5) schematically illustrating the shock absorber according to the first embodiment.
Figure 6B:
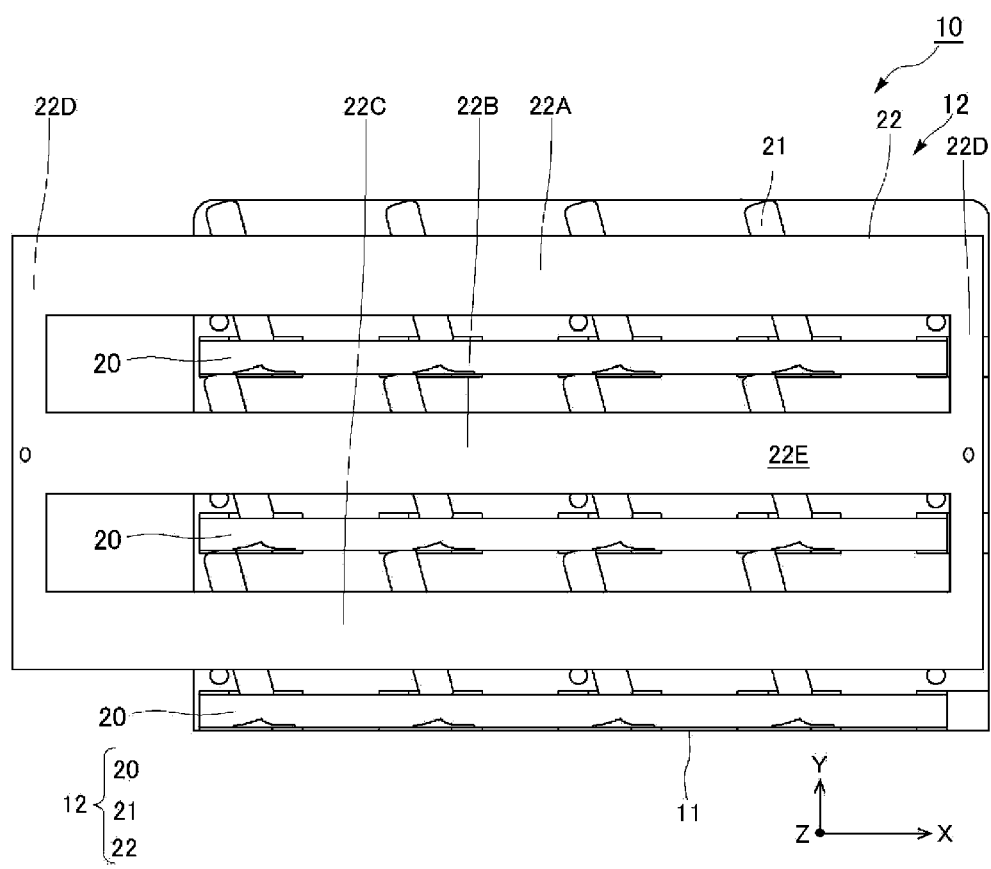
FIG. 6B is a plan view (part 6) schematically illustrating the shock absorber according to the first embodiment.

Next, the operation of the shock absorber 10 according to the present embodiment will be described with reference to FIGS. 3A to 6B. FIGS. 3A to 4B illustrate a state in which the shock absorbing portion 12 is being switched from the housed state to the protruding state. FIGS. 3A and 3B are perspective views schematically illustrating an appearance of the shock absorber 10, and FIGS. 4A and 4B are plan views schematically illustrating the appearance of the shock absorber 10. FIGS. 5A to 6B illustrate a state in which the shock absorbing portion 12 is completely switched from the housed state to the protruding state. FIGS. 5A and 5B are perspective views schematically illustrating the appearance of the shock absorber 10, and FIGS. 6A and 6B are plan views schematically illustrating the appearance of the shock absorber 10. In FIGS. 3A, 4A, 5A and 6A, the top plate portion 22 is omitted for description.

As illustrated in FIGS. 3B and 4B, the top plate portion 22 is moved in the negative direction of the X-axis from the housed state. This movement operation of the top plate portion 22 is caused by driving the top plate portion 22 in the negative direction of the X-axis by the drive unit. For example, a solenoid, a motor, an electromagnet or the like is used for the drive unit, and the drive unit is connected to the connecting portion 22D on the negative side of the X-axis of the top plate portion 22 through a string or a rod. The top plate portion 22 moves in the negative direction in the X-axis by the drive unit pulling this string or rod in the negative direction in the X-axis. The top plate portion 22 is moved to rotate and drive each fin 21 in the activating direction. The shock absorbing member 20 is rotated in the activating direction of the pivoting axis 20A by pushing up the shock absorbing member 20 to be erected by rotating and driving the fin 21 in the activating direction. As illustrated in FIGS. 5A to 6B, the shock absorbing portion 12 is switched to the protruding state by bringing the shock absorbing members 20 and the fins 21 into the standing orientation.

As illustrated in FIG. 5A, the shock absorber 10 according to the present embodiment includes a regulating portion 13 for regulating rotation in the activating direction about the pivoting axis 20A when the shock absorbing member 20 is switched from a falling down orientation to a standing orientation. In the present embodiment, one shock absorbing member 20 has five pivoting axis centers (not illustrated), and a regulating portion 13 is provided for each of the arrangement positions of the pivoting axis centers. The regulating portion 13 prevents the shock absorbing member 20 in the standing orientation from further rotating in the activating direction.

Further, as illustrated in FIG. 6A, the fin 21 includes an abutment portion 21B (an example of a "first abutment portion") abutting against the shock absorbing member 20 to be erected when the fins is switched to a standing orientation. In FIG. 6A, the abutment portion 21B of the fin 21 in the first line and the second column is denoted by a symbol, but all fins 21 include the abutment portion 21B. The abutment portion 21B regulates the shock absorbing member 20 in the standing orientation from rotating in the falling down direction.

As illustrated in FIGS. 4A and 6A, the fin 21 includes an abutment portion 21C (an example of a "second abutment portion") abutting against the shock absorbing member 20 on another column adjacent to the shock absorbing members 20 to be erected when the fins 21 is switched to the standing orientation. In FIG. 6A, the abutment portion 21C of the fin 21 located in the first line and the second column is denoted by a symbol, but at least the fins 21 in the second column and the third column include the abutment portions 21C.

Further, as illustrated in FIGS. 4A and 6A, the shock absorbing member 20 includes a groove portion 20B which suppresses interference with the abutment portion 21C of the fin 21 in the process of switching the fin 21 from a falling down orientation to a standing orientation. A groove portion 20B is formed on the side surface of the shock absorbing member corresponding to each abutment portion 21C. The groove portion 20B is formed along the movement locus of the abutment portion 21C when the fin 21 is moved. Thus, the abutment portion 21C of the fin 21 prevents the shock absorbing members 20 in another column adjacent to the shock absorbing members 20 to be erected by the fin 21 from being hindered in rotation by the abutment portion 21C.

As illustrated in FIG. 6A, the fins 21 in the second and third lines are intermediate fins 210 (an example of "intermediate auxiliary members") arranged between the shock absorbing member 20 to be erected and the shock absorbing member 20 in another column adjacent to the shock absorbing member 20 to be erected. With the intermediate fin 210 in the standing orientation, the shock absorbing members 20 to be erected abuts against the abutment portion 21B of the intermediate fin 210, and the shock absorbing members 20 on another column adjacent to the shock absorbing members 20 to be erected abuts against the second abutment portion 21C of the intermediate fin 210. Thus, the intermediate fin 210 in the standing orientation can support the shock absorbing members 20 to be erected and the shock absorbing members 20 on another column adjacent to the shock absorbing members 20 to be erected.

As illustrated in FIGS. 2B, 4B and 6B, the top plate portion 22 includes a plate-shaped portion 22E formed substantially flat. The plate-shaped portion 22E is a portion disposed on the front surface side of the top plate portion 22 so as to face an occupant. The top plate portion 22 is driven by the drive unit while maintaining the plate-shaped portion 22E parallel to the base portion 11. The plate-shaped portion 22E functions as a surface that receives the occupant's body. The plate-shaped portion 22E reduces the possibility of occupant injury. It should be noted that the top plate portion 22 needs only at least the plate-shaped portion 22E having flexibility in order to reduce the possibility of occupant injury.

As described above, since the shock absorbing portion 12 of the shock absorber 10 according to the present embodiment can be switched between the housed state and the protruding state, the shock absorbing portion 12 can be maintained in the housed state in the non-operating state to prevent the shock absorbing portion 12 from being bulky, and the shock absorber 10 can be arranged in a cabin or the like. Thus, the shock absorber 10 according to the present embodiment can be arranged in a more flexible manner. Further, because the shock absorbing portion 12 has flexibility, the shock absorber 10 can return to its original shape even after the top plate portion 22 receives the occupant, and can be repeatedly used because the shock absorber 10 is switchable between a protruding state and a housed state. In the shock absorber 10, when the drive unit activate the shock absorbing portion 12, the shock absorbing portion 12 may be switched from the housed state to the protruding state and may be switched from the protruding state to the housed state manually by an occupant. Alternatively, the drive unit may perform driving for switching the shock absorbing portion 12 from the protruding state to the housed state. For example, the drive unit may include an elastic member for biasing the top plate portion 22 in the positive X-axis direction, and when switching from the protruding state to the housed state, the top plate portion 22 may be moved in the positive X-axis direction by releasing the extension state of a string (not illustrated) attached to the top plate portion 22, to switch the shock absorbing portion 12 to the housed state.

Figure 7:
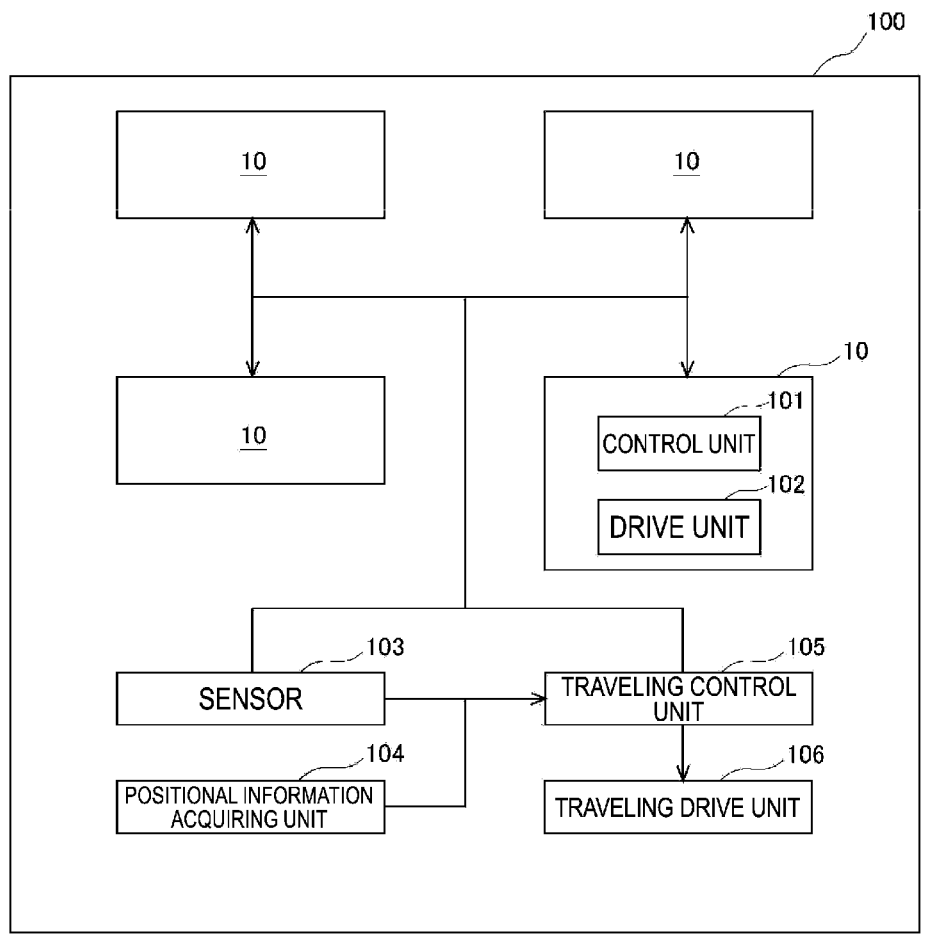
FIG. 7 is a block diagram of the shock absorber according to the first embodiment.
Figure 8:
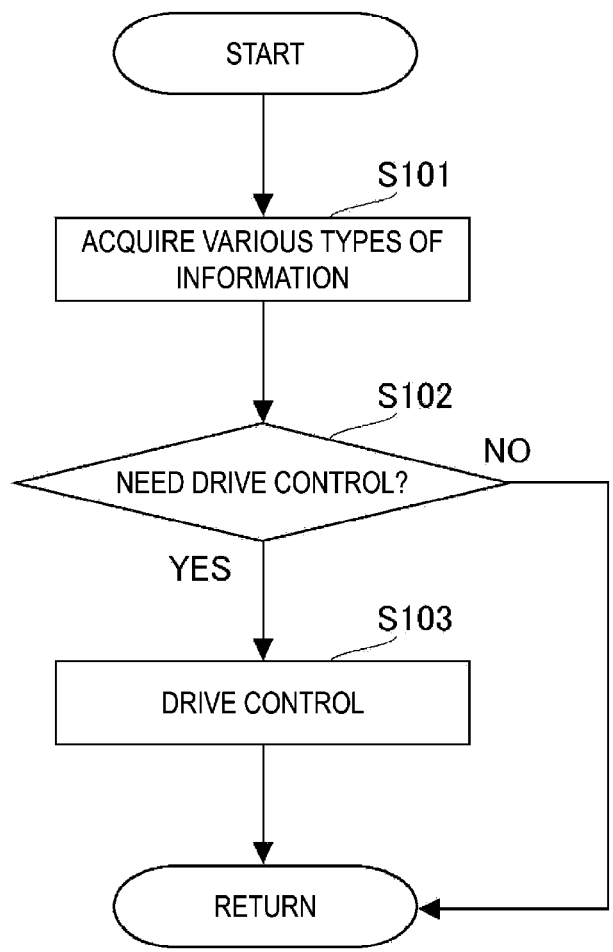
FIG. 8 is a flowchart of processing executed by a control unit of the shock absorber according to the first embodiment.

Next, the drive control of the shock absorber 10 will be described with reference to FIGS. 7 and 8. For example, the shock absorber 10 is driven such that the shock absorbing member 20 is switched from the housed state to the protruding state, when a signal indicating a sudden deceleration of a vehicle or a movement of the occupant due to an inertial force acting on the occupant is detected by the sensor or the like. FIG. 7 is a block diagram including a vehicle 100 in which the shock absorber 10 is disposed. In the present embodiment, a plurality of shock absorbers 10 are mounted in the vehicle. For example, the shock absorbers 10 may be arranged for the maximum number of passengers of the vehicle 100, and one shock absorber may be arranged for each passenger. In FIG. 7, four shock absorbers 10 are illustrated, and the function units of one of the shock absorbers 10 are typically illustrated. The shock absorber 10 includes a control unit 101. The control unit 101 is constituted by, for example, a microcomputer, and executes each processing by causing a CPU (Central Processing Unit) (not illustrated) to execute a program stored in a storage means (ROM (Read Only Memory) or the like, and not illustrated).

FIG. 7 also illustrates a sensor 103, a positional information acquiring unit 104, a traveling control unit 105, and a traveling drive unit 106, which are mounted on the vehicle 100. First, the configuration related to the vehicle 100 will be described. The vehicle 100 is capable of automatic driving on a road in an appropriate manner as autonomous traveling while sensing its surroundings. The vehicle 100 can of course be manually operated by a passenger. The sensor 103 is a means for sensing the surroundings of the vehicle 100 in order to acquire information necessary for autonomous traveling of the vehicle 100, and typically includes a stereo camera, a laser scanner, a LIDAR, various radars, or the like. The information acquired by the sensor 103 is transmitted to the traveling control unit 105, and is used by the traveling control unit 105 to recognize obstacles, pedestrians, and traffic lanes existing around the vehicle 100. In the present embodiment, the sensor 103 may include a visible light camera or an infrared camera for monitoring. The positional information acquiring unit 104 is a means for acquiring the current position of the vehicle 100, and typically includes a GPS receiver or the like. The information acquired by the positional information acquiring unit 104 is also transmitted to the traveling control unit 105, and is used for predetermined processing such as the calculation of a route for the vehicle 100 to reach a destination by using the current position of the vehicle 100 and the calculation of a required time for reaching the destination.

The traveling control unit 105 is a computer that controls the vehicle 100 based on information acquired from the sensor 103 and the positional information acquiring unit 104. The traveling control unit 105 is constituted by, for example, a microcomputer, and achieves functions for performing various processes described above by causing a CPU (Central Processing Unit) (not illustrated) to execute a program stored in a storage means (ROM (Read Only Memory) or the like, and not illustrated).

A specific example of various processing by the traveling control unit 105 includes such as: processing of generating a traveling plan for the vehicle 100; processing of detecting predetermined data around the vehicle 100 necessary for autonomous driving, based on data acquired by the sensor 103; and processing of generating a control command for controlling autonomous traveling, based on driving plan, predetermined data, and the position information of the vehicle 100 acquired by the positional information acquiring unit 104. The processing of generating a travel plan is processing of determining a travel route from a starting point to a destination. The processing of detecting predetermined data is processing for detecting, for example, the number and position of lanes, the number and position of other vehicles existing around the vehicle 100, the number and position of obstacles (e.g., pedestrians, bicycles, structures, buildings, or the like) existing around the vehicle 100, the structure of a road, a road sign, or the like. The control command is transmitted to the traveling drive unit 106 described later. A known method may be employed for generating a control command for autonomous traveling of the vehicle 100.

The traveling drive unit 106 is a means for driving the vehicle 100 based on a control command generated by the traveling control unit 105. The traveling drive unit 106 includes, for example, a motor for driving wheels, an engine, an inverter, a brake, a steering mechanism, or the like, and the motor, the brake, or the like are driven in accordance with a control command to achieve autonomous traveling of the vehicle 100.

Next, the details of the drive control will be described with reference to FIG. 8. FIG. 8 is a flowchart of the processing performed by the control unit 101. This processing is repeatedly executed at predetermined intervals by the control unit 101. First, in S101, the control unit 101 acquires various types of information. Various types of information are transmitted from a traveling control unit 105.

Next, in S102, the control unit 101 determines whether drive control is required. The control unit 101, when determining that the information indicating that the vehicle 100 has been rapidly decelerated is included in the various types of information acquired in S101, determines that drive control is necessary.

The control unit 101, when determining that the drive control is necessary in S102, executes the processing in S103. In S103, the control unit 101 executes drive control. For example, the drive unit 102 includes a solenoid, a motor, an electromagnet, or the like to drive the top plate portion 22. Thus, the shock absorber 10 according to the present embodiment can switch the shock absorbing portion 12 from the housed state to the protruding state.

Second Embodiment

Figure 9:
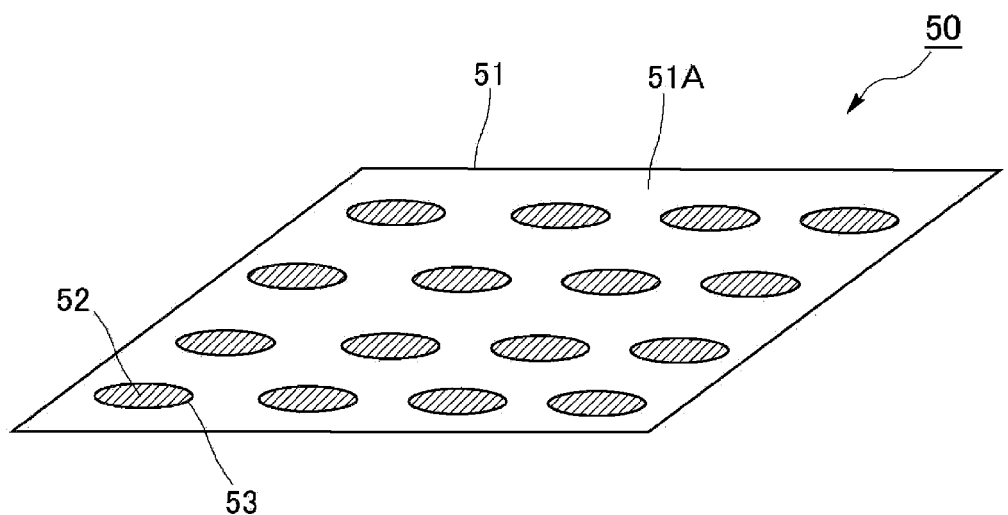
FIG. 9 is an external perspective view (part 1) schematically illustrating a shock absorber according to a second embodiment.
Figure 10:
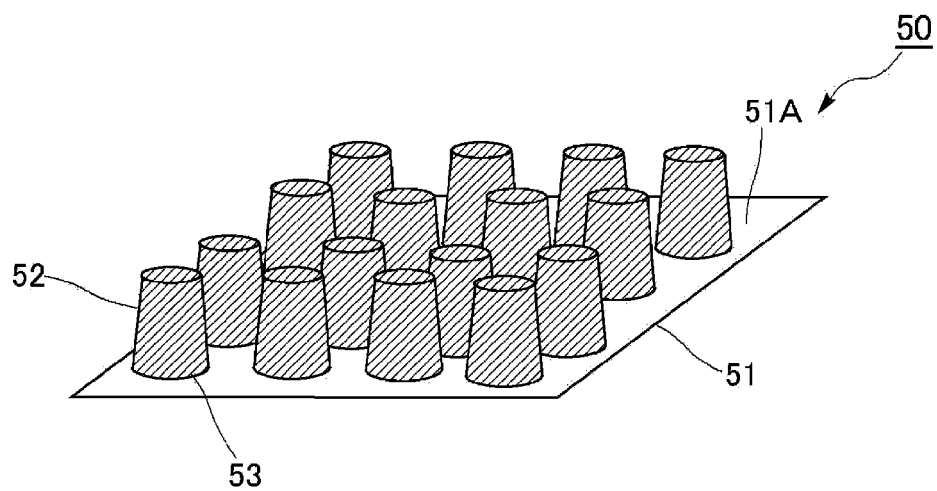
FIG. 10 is an external perspective view (part 2) schematically illustrating the shock absorber according to the second embodiment.

Next, a shock absorber 50 according to the second embodiment will be described with reference to FIGS. 9 and 10. The shock absorber 50 according to the present embodiment is exemplified as a device for protecting an occupant on a vehicle in the same manner as the shock absorber 10 according to the above-described the first embodiment. FIGS. 9 and 10 are external perspective views of the shock absorber 50 according to the present embodiment. As with the shock absorber 10 according to the first embodiment, the shock absorber 50 according to the present embodiment is a device which is attached to an attachment target constituting a vehicle, and protects an occupant during operation. The shock absorber 50 includes a base portion 51 fixed to an attachment target. In the present embodiment, the base portion 51 forms a part of the interior lining that forms the interior of a cabin. The shock absorber 50 is provided with a plurality (in the present example, 16) of shock absorbing portions 52 having flexibility and attached to the base portion 51 so as to be reversibly switchable between a housed state retracted from the cabin to the base portion 51 side and a protruding state in which the shock absorbing portion protrudes from the base portion 51 to the cabin side. A plurality of holes 53 are formed on the installation surface 51A of the base portion 51, and each of the plurality of shock absorbing portions 52 is installed in each of the plurality of holes 53. In the drawings, the shock absorbing portion 52 is illustrated with a shadow. In the present embodiment, the installation surface 51A is an interior lining that forms the interior of the cabin, and the shock absorbing portion 52 is disposed so as to protrude from the hole 53 toward the occupant boarding the vehicle. For example, the shock absorbing portion 52 may be a flexible silicone rubber widely disposed under the installation surface 51A.

In the state illustrated in FIG. 9, the shock absorbing portion 52 is in the housed state. In the housed state, the shock absorbing portions 52 is stored inside the hole 53. In the present embodiment, the shock absorbing portion 52 is, for example, a bag body that inflates when a fluid such as a compressed gas flows into the inside. Thus, the drive unit switches the shock absorbing portion 52 to the protruding state by allowing compressed gas or a predetermined liquid to flow into the shock absorbing portions 52. A drive unit can be a compressor or a pump powered by a vehicle's engine or battery. For example, in the case where the drive unit is a compressor, the compressor stores a constant amount of predetermined pressure in the pressurized bottle when the vehicle drive source is in the on state so that the compressed gas can be repeatedly supplied to the shock absorbing portions 52.

In the state illustrated in FIG. 10, the shock absorbing portions 52 are in a protruding state. In the protruding state, the shock absorbing portions 52 protrude from the respective holes 53. The drive unit inflates the shock absorbing portions 52 by supplying fluid to the interior of the shock absorbing portions, and switches to a protruding state in which the shock absorbing portion 52 protrudes from the holes 53. The drive unit in the present embodiment may be controlled by the control unit 101 illustrated in FIG. 7 as in the above embodiment. The drive unit may switch each of the shock absorbing portions 52 from the protruding state to the housed state. In this case, for example, the drive unit performs an operation to remove compressed gas or liquid from the shock absorbing portions 52.

In accordance with the shock absorber 50 according to the present embodiment, each shock absorbing portion 52 can be reversibly switched between a housed state and a protruding state, so that the shock absorber 50 can be arranged in the cabin. Thus, the shock absorber 50 according to the present embodiment can be arranged in a more flexible manner.

Further, in the present embodiment, since each shock absorbing portion 52 in the protruding state have a cylindrical shape and are filled with fluid, the impact on an occupant can be reduced even when the occupant collides with the shock absorbing portions 52. Thus, the shock absorber 50 according to the present embodiment can protect the occupant.

Other Embodiments

Although the embodiments of the present disclosure have been described above, the various embodiments described above can be combined as much as possible.

In the first embodiment, the top plate portion 22 is integrally formed by connecting the coupling portions 22A, 22B, and 22C to each other by the connecting portions 22D, but the coupling portions 22A, 22B, and 22C are not connected to each other and the respective coupling portions 22A, 22B, and 22C may be driven by the drive unit. In this case, the shock absorber 10 includes a plurality of driving force transmitting members. The drive unit may drive the fin 21 without providing the driving force transmitting member.

The shock absorber according to the first and the second embodiments can be operated to avoid collision between the occupant and the vehicle structure due to sudden braking of the vehicle even when the vehicle does not result in collision. Thus, the shock absorber according to the first and the second embodiments can be actuated every time the vehicle is suddenly braked. The shock absorber according to the first and the second embodiments can be attached to any part of the vehicle. For example, in a car, these shock absorbers are attached on a dashboard lower panel covering a steering column shaft to protect an occupant seated in a driver's seat, on the back of a front seat back to protect a passenger seated in a rear seat, or inside a seat back to prevent a submarine phenomenon of an occupant seated in a seat, or the like. These shock absorbers may also be attached outside the vehicle to protect the occupants of the vehicle in the event of a collision between the vehicle and roadside obstacles or other vehicles.

Each aspect disclosed herein may be combined with any other features disclosed herein.

REFERENCE SIGNS LIST 10, 50 Shock absorber
11, 51 Base portion
12, 52 Shock absorbing portion
13 Regulating portion
20 Shock absorbing member
20A, 21A Pivoting axis
20B Groove portion
21 Fin
21B, 21C Abutment portion
51A Installation surface
53 Hole
100 Vehicle
101 Control unit
102 Drive unit
103 Sensor
104 Positional information acquiring unit
105 Traveling control unit
106 Traveling drive unit

The invention claimed is:

1. A shock absorber that is attached to an attachment target constituting a vehicle and reduces a shock during operation, the shock absorber, comprising:
a base portion fixed to the attachment target;
a shock absorbing portion having flexibility and attached to the base portion, the shock absorbing portion being reversibly switchable between a housed state in which the shock absorbing portion is retracted toward the base portion and a protruding state in which the shock absorbing portion protrudes from the base portion; and
a drive unit configured to drive the shock absorbing portion and reversibly switch between the housed state and the protruding state, the drive unit at least switching the shock absorbing portion from the housed state to the protruding state when operating the shock absorption portion,
wherein the shock absorbing portion includes a plurality of shock absorbing members provided in a plurality of columns, the plurality of shock absorbing members each being rotatably attached to a first pivoting axis of a plurality of first pivoting axes that extend in a first direction relative to an installation surface of the base portion and are spaced apart from each other in a direction orthogonal to the first direction,
each of the plurality of shock absorbing members provided in the plurality of columns is:
maintained in a falling down orientation along the installation surface in the housed state;
rotated and driven in a predetermined activating direction about the first pivoting axis and switched from the falling down orientation to a standing orientation in which each of the plurality of shock absorbing members is erected from the installation surface, when being switched from the housed state to the protruding state; and
rotated and driven in the falling down direction opposite to the activating direction about the first pivoting axis and switched from the standing orientation to the falling down orientation, when being switched from the protruding state to the housed state.

2. The shock absorber according to claim 1, further comprising
a regulating portion configured to regulate the rotation about the first pivoting axis in the activating direction when each of the plurality of shock absorbing members is switched from the falling down orientation to the standing orientation.

3. The shock absorber according to claim 2, wherein the shock absorbing portion further includes a plurality of auxiliary members having flexibility and configured to erect the plurality of shock absorbing members, the plurality of auxiliary members being rotatably attached on an installation surface about a second pivoting axis intersecting the first pivoting axis,
each of the plurality of auxiliary members is maintained in a falling down orientation along the installation surface in the housed state in a manner that a part of a shock absorbing member to be erected of the plurality of shock absorbing members covers, from above, at least a part of an auxiliary member of the plurality of auxiliary members,
each of the plurality of auxiliary members is rotated and driven in a predetermined activating direction about the second pivoting axis and switched from the falling down orientation to a standing orientation, when being switched from the housed state to the protruding state,
each of the plurality of auxiliary members is rotated and driven in the falling down direction opposite to the activating direction about the second pivoting axis and switched from the standing orientation to the falling down orientation, when being switched from the protruding state to the housed state, and
each of the plurality of auxiliary members rotates the shock absorbing member to be erected in an activating direction of the first pivoting axis by pushing up the shock absorbing members, when being switched from the falling down orientation to the standing orientation.

4. The shock absorber according to claim 3, wherein the plurality of auxiliary members each include a first abutment portion that abuts against the shock absorbing member to be erected when being switched to the standing orientation, and the first abutment portion regulates rotation of the shock absorbing member to be erected in the falling down direction.

5. The shock absorber according to claim 4, wherein the plurality of auxiliary members each include a second abutment portion that abuts against a shock absorbing member in another column adjacent to the shock absorbing member to be erected, when being switched to the standing orientation.

6. The shock absorber according to claim 5, wherein an angle formed between the first pivoting axis and the second pivoting axis is an acute angle, and
the plurality of shock absorbing members each include a groove portion that prevents each of the plurality of auxiliary members from interfering with the second abutment portion of the auxiliary member, in a process of switching the plurality of auxiliary members from the falling down orientation to the standing orientation.

7. The shock absorber according to claim 5, wherein at least a part of the plurality of auxiliary members is an intermediate auxiliary member disposed between the shock absorbing member to be erected and the shock absorbing member on another column adjacent to the shock absorbing member to be erected, and
when the intermediate auxiliary member is in the standing orientation, the shock absorbing member to be erected and the first abutment portion of the intermediate auxiliary member abut against each other, and the shock absorbing members on the other column and the second abutment portion of the intermediate auxiliary member abut against each other.

8. The shock absorber according to claim 3, wherein the shock absorbing portion further includes one or more driving force transmitting members coupled to an auxiliary member of the plurality of auxiliary members, at least partially having flexibility, and driven by the drive unit, and
by driving the one or more driving force transmitting members when the drive unit actuates the shock absorbing portion, the auxiliary member is switched from the falling down orientation to the standing orientation, and the shock absorbing member is switched from the falling down orientation to the standing orientation, accompanying the auxiliary members.

9. The shock absorber according to claim 8, wherein the shock absorbing portion includes a single driving force transmitting member, and the plurality of auxiliary members are coupled to the single driving force transmitting member.

10. The shock absorber according to claim 8, wherein the driving force transmitting member includes a plate-shaped portion and is driven by the drive unit while maintaining a state in which the plate-shaped portion is parallel to the installation surface.

11. The shock absorber according to claim 6, wherein the groove portion is formed on the side surface of the each of the shock absorbing members corresponding to the second abutment portion, and the groove portion is formed along a movement locus of the second abutment portion when each of the plurality of the auxiliary members is moved.

12. The shock absorber according to claim 6, wherein at least a part of the plurality of auxiliary members is an intermediate auxiliary member disposed between the shock absorbing member to be erected and the shock absorbing member on another column adjacent to the shock absorbing member to be erected, and
when the intermediate auxiliary member is in the standing orientation, the shock absorbing member to be erected and the first abutment portion of the intermediate auxiliary member abut against each other, and the shock absorbing members on the other column and the second abutment portion of the intermediate auxiliary member abut against each other.

13. The shock absorber according to claim 4, wherein the shock absorbing portion further includes one or more driving force transmitting members coupled to an auxiliary member of the plurality of auxiliary members, at least partially having flexibility, and driven by the drive unit, and
by driving the one or more driving force transmitting members when the drive unit actuates the shock absorbing portion, the auxiliary member is switched from the falling down orientation to the standing orientation, and the shock absorbing member is switched from the falling down orientation to the standing orientation, accompanying the auxiliary members.

14. The shock absorber according to claim 5, wherein the shock absorbing portion further includes one or more driving force transmitting members coupled to an auxiliary member of the plurality of auxiliary members, at least partially having flexibility, and driven by the drive unit, and
by driving the one or more driving force transmitting members when the drive unit actuates the shock absorbing portion, the auxiliary member is switched from the falling down orientation to the standing orientation, and the shock absorbing member is switched from the falling down orientation to the standing orientation, accompanying the auxiliary members.

15. A shock absorber that is attached to an attachment target constituting a vehicle and reduces a shock during operation, the shock absorber, comprising:
a base portion fixed to the attachment target;
a shock absorbing portion having flexibility and attached to the base portion, the shock absorbing portion being reversibly switchable between a housed state in which the shock absorbing portion is retracted toward the base portion and a protruding state in which the shock absorbing portion protrudes from the base portion;
a drive unit configured to drive the shock absorbing portion and reversibly switch between the housed state and the protruding state, the drive unit at least switching the shock absorbing portion from the housed state to the protruding state when operating the shock absorption portion; and
a plurality of the shock absorbing portions, wherein
a plurality of holes are formed on an installation surface of the base portion,
each of the plurality of shock absorbing portions is installed in a hole of the plurality of holes,
in the housed state, the shock absorbing portion is stored in the hole,
in the protruding state, the shock absorbing portion protrude from the hole, and the drive unit switches to the protruding state in which the shock absorbing portion protrudes from the hole, by supplying fluid into the shock absorbing portion and expanding the shock absorbing portion.

16. The shock absorber according to claim 15, wherein the installation surface is an interior lining that forms an interior of a cabin, and each of the plurality of shock absorbing portions is arranged and protrudes from the hole toward an occupant boarding the vehicle.

* * * * *